United States Patent
Onishi et al.

(10) Patent No.: US 9,876,922 B2
(45) Date of Patent: Jan. 23, 2018

(54) IMAGE FORMING APPARATUS WITH A SHORT-RANGE WIRELESS COMMUNICATION ANTENNA

(71) Applicant: KYOCERA Document Solutions Inc., Osaka (JP)

(72) Inventors: Kenichi Onishi, Osaka (JP); Kohei Ishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/448,137

(22) Filed: Mar. 2, 2017

(65) Prior Publication Data
US 2017/0257502 A1  Sep. 7, 2017

(30) Foreign Application Priority Data
Mar. 2, 2016  (JP) .................. 2016-039627

(51) Int. Cl.
*H04N 1/00* (2006.01)

(52) U.S. Cl.
CPC ..... *H04N 1/00559* (2013.01); *H04N 1/00411* (2013.01); *H04N 1/00496* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2013/0286433 A1* | 10/2013 | Matsushima | ...... | G03G 15/5087 358/1.15 |
| 2014/0146334 A1* | 5/2014 | Yuzawa | ............ | H04N 1/00127 358/1.13 |
| 2015/0116742 A1* | 4/2015 | Han | .................. | H04N 1/00519 358/1.12 |
| 2015/0338823 A1 | 11/2015 | Yuzawa | | |

FOREIGN PATENT DOCUMENTS

| | | |
|---|---|---|
| JP | 2013-228540 A | 11/2013 |
| JP | 2014-106481 A | 6/2014 |

\* cited by examiner

*Primary Examiner* — Moustapha Diaby
(74) *Attorney, Agent, or Firm* — Hawaii Patent Services; Nathaniel K. Fedde; Kanton N. Fedde (57) ABSTRACT

Provided is an image forming apparatus that is able to concentrate user access, and maintain a high degree of usability. The image forming apparatus is an image forming apparatus with a short-range wireless communication antenna that includes a main unit that performs image formation, and an operation unit that includes a touch-panel device and that is attached to the front of the main unit. The antenna is located in a space at the top inside a housing of the operation unit where the touch-panel device is not located.

3 Claims, 7 Drawing Sheets

IMAGE FORMING APPARATUS WITH A SHORT-RANGE WIRELESS COMMUNICATION ANTENNA

INCORPORATION BY REFERENCE

This application is based on and claims the benefit of priority from Japanese Patent Application No. 2016-039627 filed on Mar. 2, 2016, the contents of which are hereby incorporated by reference.

BACKGROUND

The present disclosure relates to an image forming apparatus with a short-range wireless communication (NFC) antenna.

In recent years, image forming apparatuses have been proposed that are capable of performing image formation by receiving operations or image data for printing from portable terminals such as smartphone or tablet terminals using short-range wireless communication. Such image forming apparatuses have an antenna for short-range wireless communication.

In short-range wireless communication, the communication distance between a portable terminal and an antenna is short, so investigating the antenna arrangement in an image forming apparatus is difficult. In typical technology, providing an antenna in a position where it is possible to see the antenna from the upper side of the top surface of a cover is proposed.

SUMMARY

The image forming apparatus of the present disclosure is an image forming apparatus with a short-range wireless communication antenna, that includes a main unit that includes an image forming unit for performing image formation, and an operation unit that includes a touch-panel device and that is attached to the front of the main unit. The antenna is located on the inside of a housing of the operation unit in a space at the top of the inside of the housing where the touch-panel device is not located.

DETAILED DESCRIPTION

Next, an embodiment of the present disclosure will be explained in detail with reference to the drawings.

Figure 1:
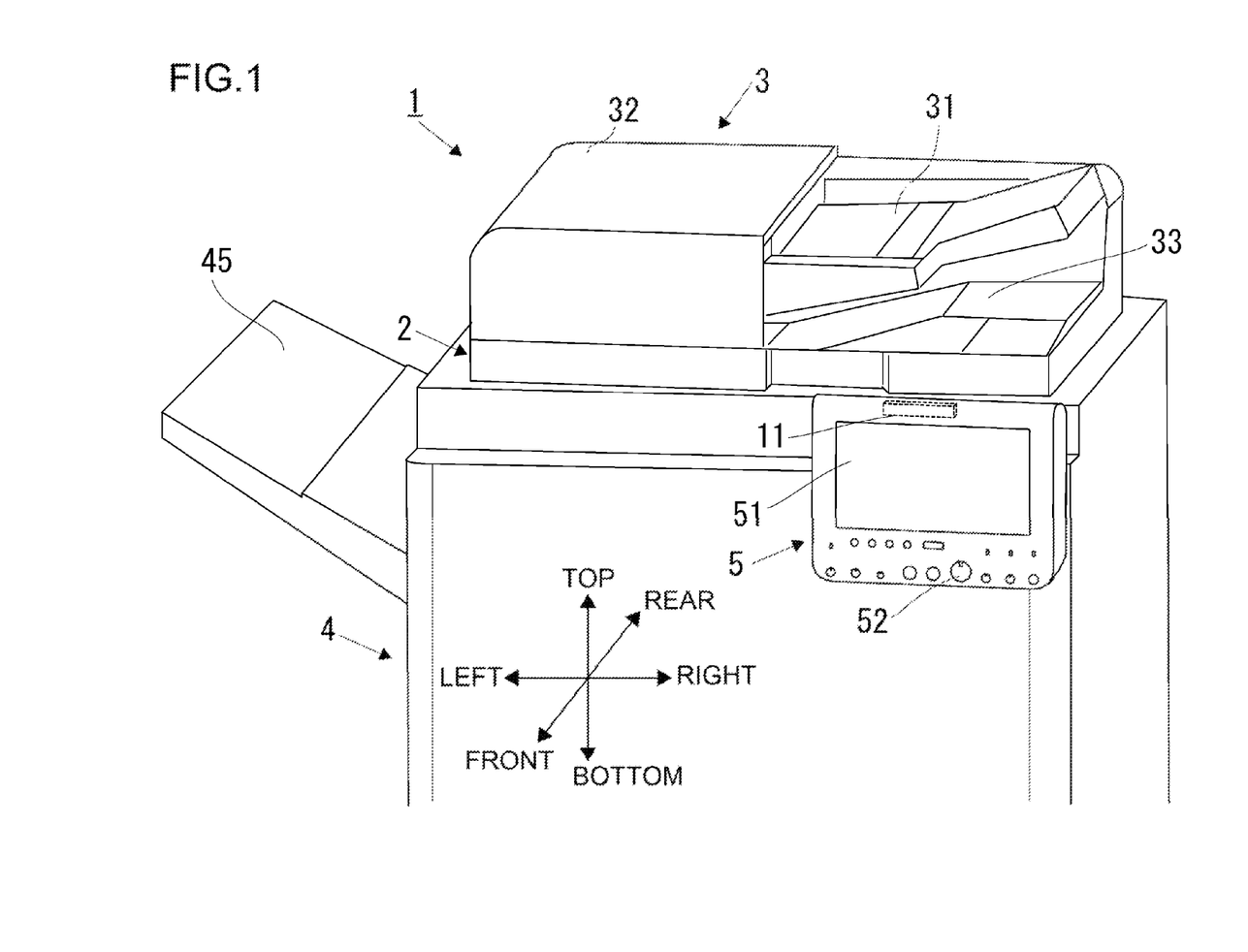
FIG. 1 is a perspective view illustrating an embodiment of an image forming apparatus of the present disclosure.

The image forming apparatus 1 of this embodiment is an apparatus such as a copier, a scanner, a multifunction machine and the like that forms an image. Referring to FIG. 1, the image forming apparatus 1 includes a manuscript reader 2, a manuscript feeder 3, a main unit 4, and an operation unit 5. The manuscript reader 2 is arranged at an upper portion of the main unit 4, and the manuscript feeder 3 is arranged at an upper portion of the manuscript reader 2.

The operation unit 5 that is used to perform settings and operation instructions of the image forming apparatus 1 is arranged on the front side of the image forming apparatus 1. The operation unit 5 includes a touch panel device 51, and various operation buttons 52. By inputting instructions by operating the operation unit, a user performs various settings for the image forming apparatus 1 and executes various functions such as image formation and the like.

Figure 2:
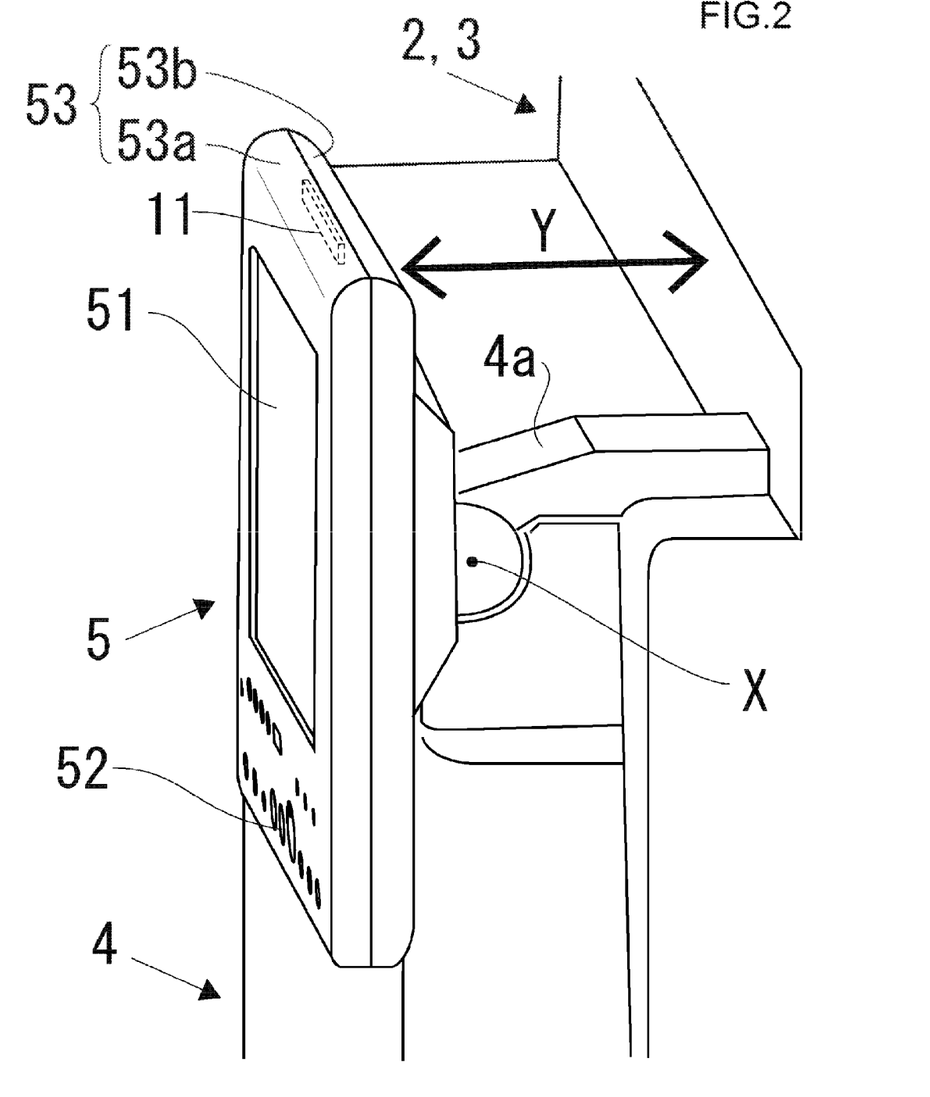
FIG. 2 is an exterior perspective view illustrating the construction for mounting the operation unit illustrated in FIG. 1.

Referring to FIG. 2, the operation unit 5 is mounted by way of a support member 4a that is provided on the top of the main unit 4 and can be rotated about the front surface of the main unit 4. The axis of rotation X of the operation unit 5 is arranged in the horizontal direction of the main unit 4 (horizontal direction when the image forming apparatus 1 is placed horizontally). As a result, the angle of the touch panel device 51 can be adjusted according to the line of sight that differs according to the height of the user and the like, so visibility is improved. In order to maintain the range of rotation of the operation unit 5, a space Y is formed between the top section of the operation unit 5 and the manuscript reader 2 and manuscript feeder 3.

The touch panel device 51 includes a display, and a touch panel that is provided on the display surface of the display. A liquid-crystal display panel is used for the display, for example, and various operation keys for receiving operation input and various guidance screens are displayed on the display. The touch panel detects input due to pressure such as from a finger of a user or a stylus, and by outputting a signal that corresponds to a position where input was detected, the operation for the operation key that is displayed on the display is received. It is possible to use a resistive membrane type or capacitance type touch panel as the touch panel.

A start button, stop/clear button, a reset button, ten-key buttons and the like are provided as operation buttons 52. The start button is used by the user to give an instruction to start image formation. The stop/clear button is used when stopping image formation. The reset button is used when setting the various settings of the image forming apparatus 1 to the default state.

A short-range wireless antenna 11 is arranged inside the housing 53 of the operation unit 5. The housing 53 is made using a non-conductive resin material such as plastic, and includes a front cover 53a in which an opening is formed that exposes the display surface (operation surface) of the touch panel device 51, and a rear cover 53b. The touch panel device 51, operation buttons 52 and antenna 11 are arranged between the front cover 53a and the rear cover 53b. The operation buttons 52 are arranged on the bottom side of the touch panel device 51. The antenna 11 is arranged so as to be separated by 3 mm or more from the top side of the touch panel device 51.

Figure 3A:
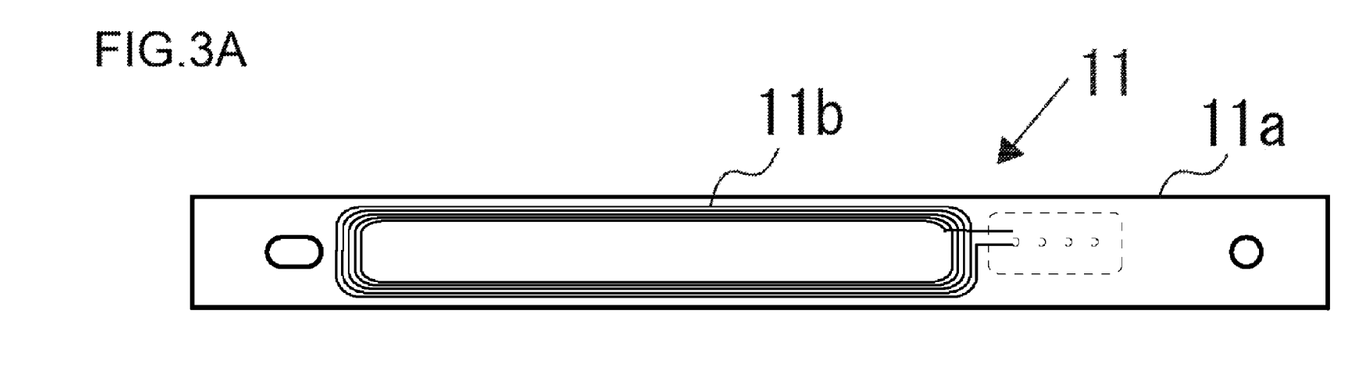
FIG. 3A illustrates the illustrates the construction of the antenna illustrated in FIG. 2, and illustrates top surface of the antenna.
Figure 3B:
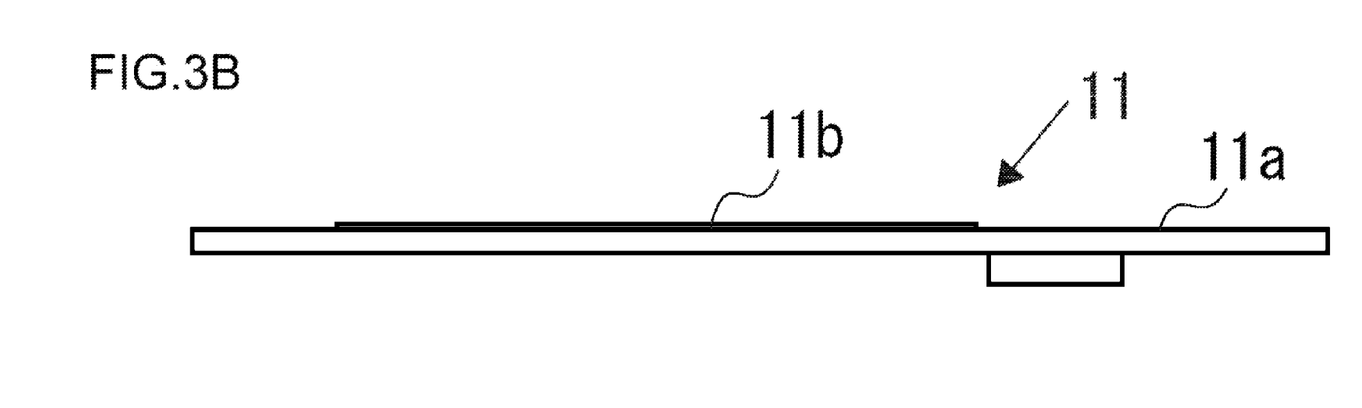
FIG. 3B illustrates the illustrates the construction of the antenna illustrated in FIG. 2, and illustrates side surface of the antenna.
Figure 3C:
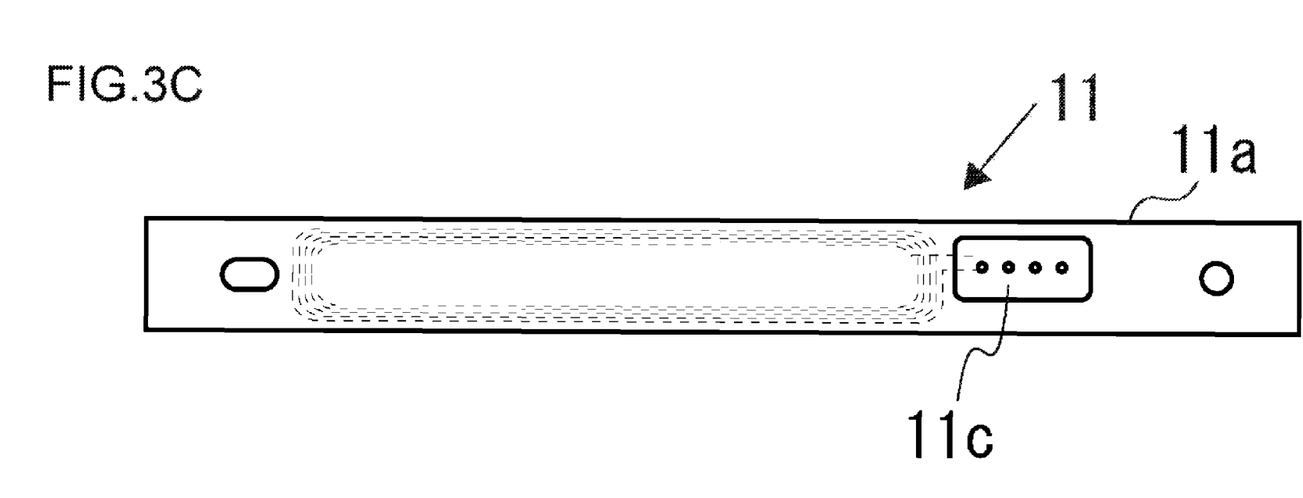
FIG. 3C illustrates the illustrates the construction of the antenna illustrated in FIG. 2, and illustrates rear surface of the antenna.

The antenna 11, as illustrated in FIG. 3A, FIG. 3B and FIG. 3C, includes an antenna substrate 11a, an antenna wire 11b, and a connector 11c. The antenna wire 11b is formed on one surface of the antenna substrate 11a. The connector 11c is provided on another rear surface of the of the antenna substrate 11a, and is a connecting terminal for connecting to a wireless communication unit 10. FIG. 3A illustrates the top surface of the antenna 11, FIG. 3B illustrates a side surface of the antenna 11, and FIG. 3C illustrates the rear surface of the antenna 11. The antenna 11 is arranged inside the housing 53 so that the surface of the antenna substrate 11a where the antenna wire 11b is formed is facing the same direction as the display surface (operation surface) of the touch panel device 51. The top of the housing 53 is formed into an approximately semi-circular shape as seen from the side surface, and the antenna 11 is arranged so as to fit into the approximately semi-circular shaped space at the top of the housing as seen from this side surface. The antenna wire 11b is formed into an antenna shape that is horizontally long in the horizontal direction when compared with the vertical direction of the operation unit 5, and the length in the horizontal direction of the antenna wire 11b is set to be 40 mm or greater. This 40 mm is set with a 60 mm width of a one-hand sized smartphone as a reference, and can be appropriately set according to the portable terminal 100 to be used. The touch panel device 51 is not arranged in the top space inside the housing. Therefore, the length in the horizontal direction of the antenna wire 11b (antenna substrate 11a) can be lengthened to the length in the horizontal direction of the operation unit 5. Moreover, the touch-panel device 51, which has metal objects, is not arranged in the normal direction of the antenna substrate 11a. By doing so, it is possible to maintain good communication performance when using the portable terminal 100 to perform short-range wireless communication.

Figure 4:
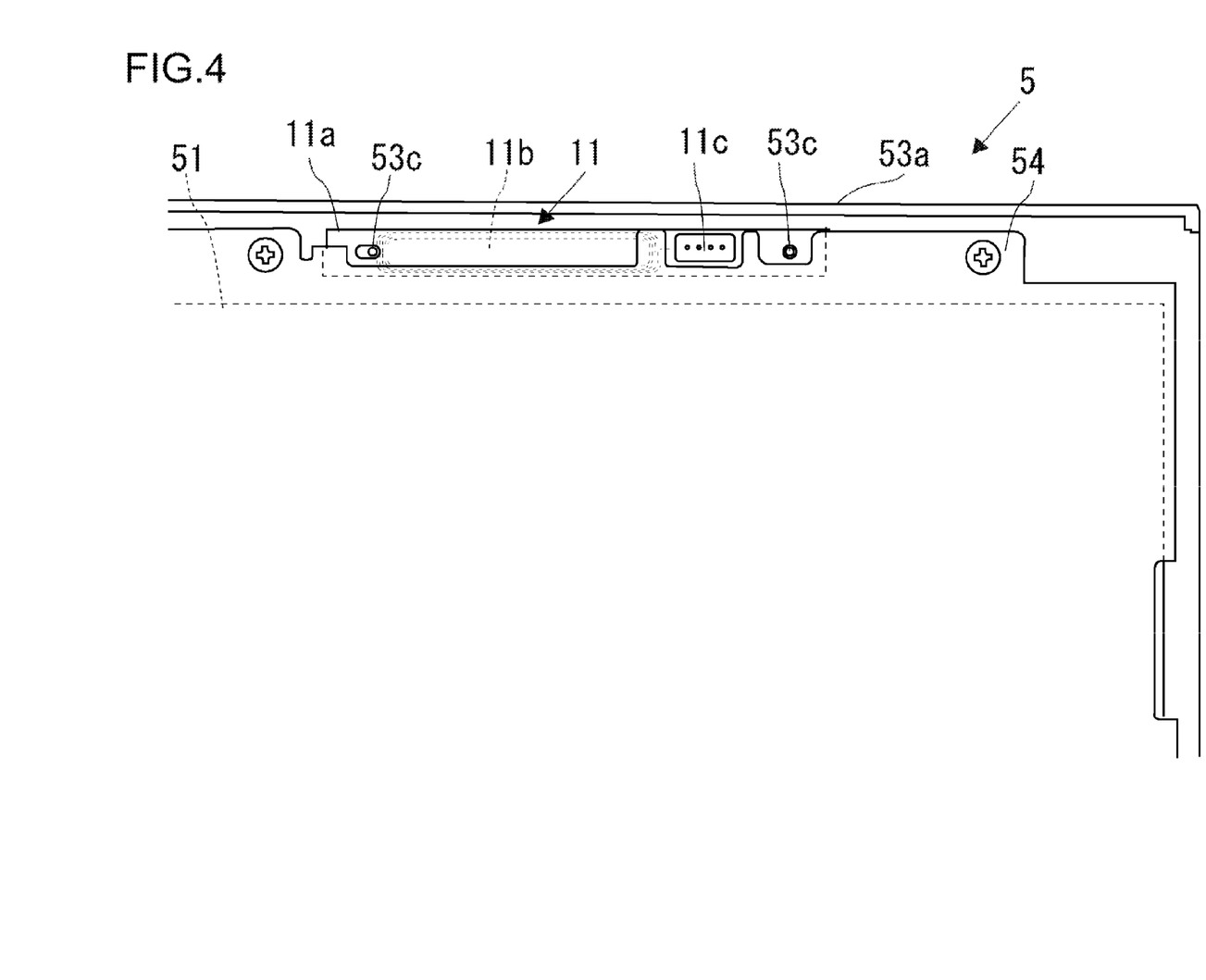
FIG. 4 illustrates the construction for mounting the antenna illustrated in FIG. 2.

The antenna substrate 11a, as illustrated in FIG. 4, is fastened by a frame 54 after being positioned by protrusions 53 that are formed in the front cover 53a. FIG. 4 is a view of the operation unit 5 with the rear cover 53b removed as seen from the rear side. The frame 54 is plate metal for maintaining the strength of the operation unit 5, and functions as GND (ground). The frame 54 extends over the rear surface of the antenna substrate 11a in areas near the end sections of the antenna substrate 11a and near the connector 11c, with most of the rear surface of the antenna substrate 11a open. Moreover, the thickness of the antenna substrate 11a is set to 3 mm. Therefore, metal objects are not arranged within 3 mm from the perimeter of the antenna wire 11b that is formed on one surface of the antenna substrate 11a. As a result, it is possible to maintain good communication performance when using the portable terminal 100 to perform short-range wireless communication.

Figure 5:
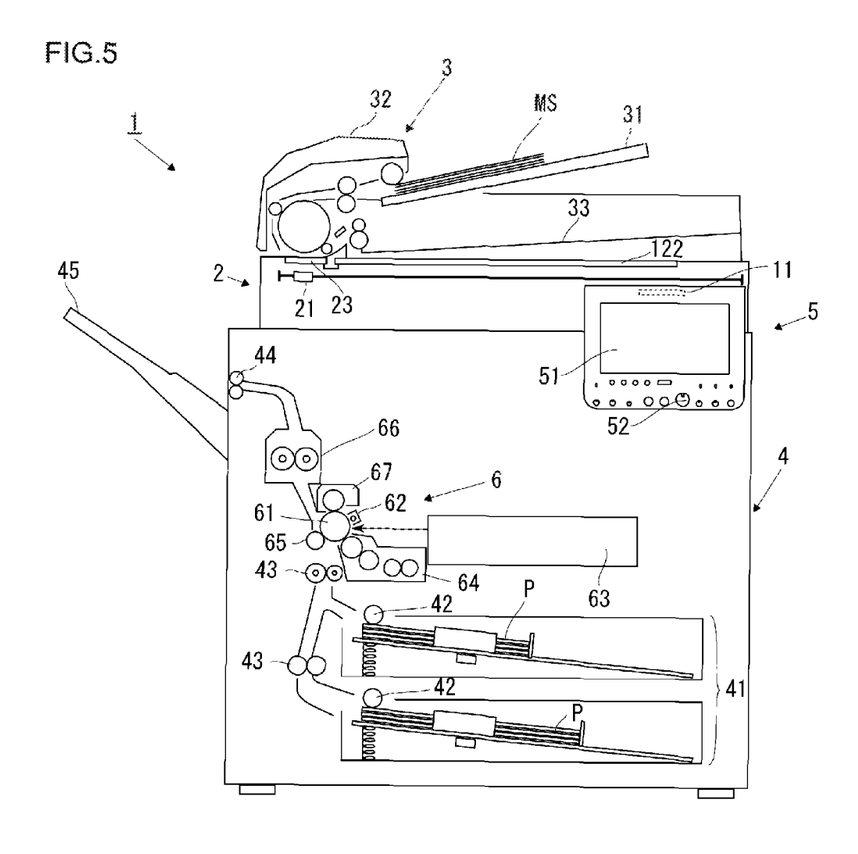
FIG. 5 is a cross-sectional schematic view illustrating the internal construction of the image forming apparatus illustrated in FIG. 1.

Referring to FIG. 5, the manuscript reader 2 includes a scanner 21, a platen glass 22 and a manuscript reading slit 23. The scanner 21 includes a light source that uses an LED (Light Emitting Diode), and a light receiving unit that includes a CCD (Charge Coupled Device) line sensor, CMOS (Complimentary Metal Oxide Semiconductor) line sensor or the like, and is configured so that a manuscript MS can be moved in a conveyance direction by the manuscript feeder 3. The manuscript reading slit 23 is a slit that is formed in a direction orthogonal to the conveyance direction of the manuscript MS by the manuscript feeder 3.

The manuscript feeder 3 includes a manuscript placement section 31, a manuscript conveyance mechanism 32 and a manuscript output unit 33. Manuscripts MS that are set in the manuscript placement section 31 are sequentially fed out one sheet at a time by the manuscript conveyance mechanism 32 to a position that faces the manuscript reading slit 23, and after that, outputted by the manuscript output unit 33. The manuscript feeder 3 and manuscript reader 2 are connected on the rear side of the image forming apparatus 1 by a hinge mechanism, and the manuscript feeder 3 functions as a platen cover that opens or closes the top surface of the platen glass 22. By opening up the manuscript feeder 3, the top surface of the platen glass 22 is opened and it is possible to set a manuscript on the platen glass 22.

When a manuscript MS is not set on the manuscript placement unit 31, or when the manuscript feeder 3 (platen cover) is open, and an instruction is given using the operation buttons 52 of the operation unit 5 to read a manuscript MS, a manuscript MS that is set on the platen glass 22 is read. When reading a manuscript MS that is placed on the platen glass 22, the scanner 21 is moved to a position that faces the platen glass 22. Then, the scanner 21 reads and acquires image data while scanning the manuscript MS that is set on the platen glass 22 from a sub-scanning direction reference line in a sub-scanning direction that is orthogonal to a main scanning direction, and outputs the acquired image data to the main unit 4.

When the operation buttons 52 of the operation unit 5 are used to give an instruction to read a manuscript MS when a manuscript MS is set on the manuscript placement unit 31, a manuscript that is conveyed by the manuscript feeder 3 is read. The manuscript MS is set on the manuscript placement unit 31 with the surface (surface from which the manuscript image is to be read) facing upward. Then, the manuscript MS that was set on the manuscript placement unit 31 is conveyed from the left side by the manuscript feeder 3, and the surface of the manuscript MS is led to a position facing the manuscript reading slit 23. Moreover, when reading the manuscript MS that was conveyed by the manuscript feeder 3, the scanner 21 is moved to a position that faces the manuscript reading slit 23. Then, by way of the manuscript reading slit 23, the scanner 21 reads and acquires image data from the manuscript MS in synchronization with the conveyance operation by the manuscript feeder 3, and outputs the acquired image data to the main unit 4.

The main body 4, together with including an image forming unit 6, includes a paper feeding unit 41, a paper feeding roller 42, a conveying roller 43 and an output roller 44. The paper feeding unit 41 is a paper feeding cassette in which sheets of printing paper P are stored. The paper feeding roller 42 feeds printing paper P one sheet at a time from the paper feeding unit 41 to a paper conveying path. Printing paper P that has been fed out to the paper conveying path by the paper feeding roller 42 is conveyed to the image forming unit 6 by the conveying roller 43. Then, printing paper P on which printing was performed by the image forming unit 6 is outputted to an output tray 45 by the output roller 44. In this way, the paper feeding roller 42, the conveying roller 43 and the output roller 44 function as a conveying unit for the printing paper P.

The image forming unit 6 includes a photosensitive drum 61, a charging unit 62, an exposing unit 63, an image forming unit 64, a transferring unit 65, a fixing unit 66 and a cleaning unit 67. The exposing unit 63 is an optical unit that includes a laser device, mirrors and the like. The exposing unit 63 outputs laser light based on the image data and exposes the photosensitive drum 61 that has been charged by the charging unit 62 with uniformity, and forms an electrostatic latent image on the surface of the photosensitive drum 61. The image forming unit 64 is a developing unit that uses toner to develop the electrostatic latent image that was formed on the photosensitive drum 61. The image forming unit 64 causes a toner image to be formed on the photosensitive drum 61 based on the electrostatic latent image. The transferring unit 65 causes the toner image that was formed on the photosensitive drum 61 by the image forming unit 64 to be transferred to printing paper P. The fixing unit 66 heats the printing paper P on which the toner image was transferred by the transferring unit 65 and fixes the toner image on the printing paper P. Then, the cleaning unit 67 removes the toner that remains on the photosensitive drum 61.

Figure 6:
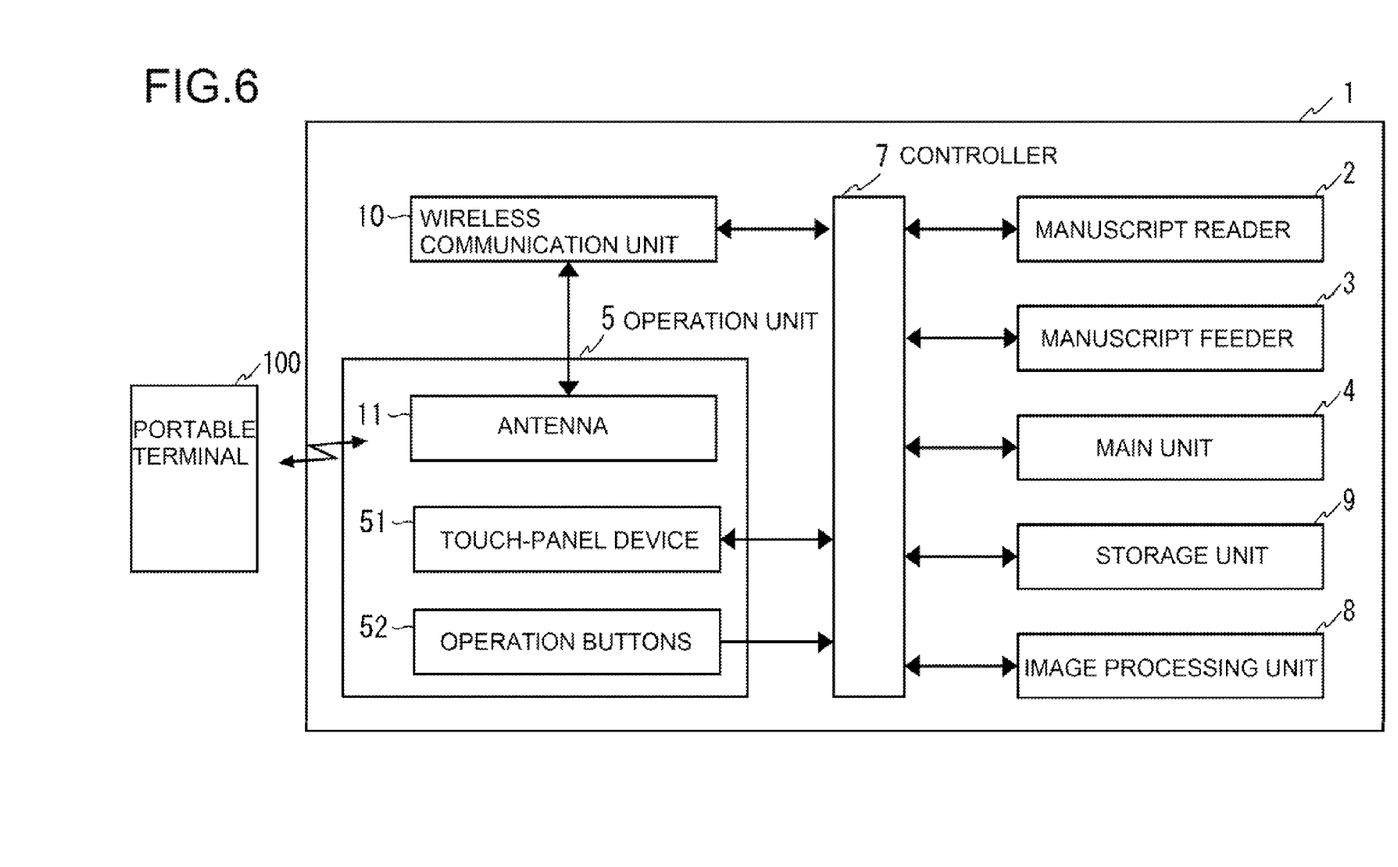
FIG. 6 is a block diagram illustrating an overview of the configuration of the image forming apparatus illustrated in FIG. 1.

FIG. 6 is a block diagram that illustrates an overview of the configuration of the image forming apparatus 1. The aforementioned manuscript reader 2, the manuscript feeder 3, the main unit 4 (paper feeding unit 41, paper feeding roller 42, conveying roller 44, output roller 45, image forming unit 6) and operation unit 5 are connected to a controller 7, and the operation is controlled by the controller 7. An image processing unit 8, a storage unit 9 and a wireless communication unit 10 are also connected to the controller 7.

The controller 7 is an information processing unit such as a microcomputer that includes ROM (Read Only Memory), RAM (Random Access Memory) and the like. A control program for performing operation control of the image forming apparatus 1 is stored in ROM. The controller 7 reads the control program that is stored in ROM, and by expanding the control program in RAM, performs control of the entire apparatus according to specified instruction information that was inputted from the operation unit 5.

The image processing unit 8 performs specified image processing on image data; for example, rotation processing, enlargement or reduction processing, and image improvement processing such gradation adjustment, density adjustment and the like.

The storage unit 9 is storage such as a semiconductor memory, HDD (Hard Disk Drive) and the like, and together with storing image data that was acquired by the manuscript reader 2 reading a manuscript MS, stores various kinds of management information.

The wireless communication unit 10 has a function of transmitting various kinds of data to and receiving various kinds of data from a portable terminal 100 using short-range wireless communication by way of a short-range wireless communication antenna 11. The controller 7 performs control of the entire apparatus according to specified instruction information that was received from a portable terminal 100 via the wireless communication unit 10.

In this embodiment, the short-range wireless communication antenna 11 having a short communication distance from a portable terminal 100 is located at the top of the operation unit 5. Therefore, the portable terminal 100 must be moved to a position near the operation unit 5 (for example, about 20 mm), and so it is possible that the portable terminal or the hand of a user holding the portable terminal may mistakenly touch the touch-panel device 51 or operation buttons 52 of the operation unit 5. Therefore, while communication is established between the wireless communication unit 10 and the portable terminal 100, or in other words, while short-range wireless communication is established by way of the antenna 11, the controller 7 disables operation by the touch panel and operation buttons 52 of the touch-panel device 51. By doing so, it is possible to prevent misoperation due to a portable terminal 100 or hand of a user that has been moved to a position near the operation unit 5 when performing short-range wireless communication using a portable terminal 100.

As was explained above, this embodiment discloses an image forming apparatus 1 with a short-range wireless communication antenna 11 that includes a main body 4 that includes an image forming unit 6 that performs image formation, and an operation unit 5 that is attached to the front of the main unit 4 and includes a touch-panel device 51. The antenna 11 is located inside the housing 53 of the operation unit 5 in a space at the top inside the housing where the touch-panel device 51 is not located.

With this configuration, even when performing short-range wireless communication using a portable terminal 100, it is possible to concentrate user access to the operation panel 5 that includes the touch-panel device 51, and to maintain a high degree of usability. Moreover, the touch-panel device 51 is not located in the space at the top inside the housing where the antenna 11 is located, so the length in the horizontal direction of the antenna 11 can be lengthened to the length in the horizontal direction of the operation panel 5, and it is possible to decrease the effect that the metal objects of the touch-panel device 51 have on short-range wireless communication. As a result, an antenna 11 having a size that can satisfy both the requirement for communication distance and sensitivity can be located in a position with good user access.

Moreover, in this embodiment, the antenna 11 includes an antenna substrate 11a, and an antenna wire 11b that is formed on one surface of the antenna substrate 11a. The surface of the antenna substrate 11a where the antenna wire 11b is formed is arranged so as to face in the same direction as the display surface of the touch-panel device 51.

With this configuration, it is possible to align the antenna surface of the antenna 11 with the display surface of the touch-panel device 51 that is viewed by the user. Therefore, user access can be easily performed with respect to the antenna surface of the antenna 11.

Furthermore, in this embodiment, the operation unit 5 is attached so as to be able to rotate around an axis of rotation X that is arranged in the horizontal direction of the main unit 4.

With this configuration, it is possible to align the antenna surface of the antenna 11 with the display surface of the touch-panel device 51 that is rotated according to the line of side of the user. Therefore, user access can be easily performed with respect to the antenna surface of the antenna 11.

Moreover, in this embodiment there are no metal objects located within 3 mm from the perimeter of the antenna wire 11b.

With this configuration, it is possible to maintain good communication performance when performing short-range wireless communication using a portable terminal 100.

Furthermore, in this embodiment, while short-range wireless communication is established by way of the antenna 11, operation using the touch-panel device 51 is disabled.

With this configuration, it is possible to prevent misoperation due to a portable terminal 100 or the hand of a user that is moved to a position near the operation unit 5 during short-range wireless communication using a portable terminal 100.

In recent years, large touch-panel devices have been used for operating image forming apparatuses, and the touch-panel device may be provided separate from top surface section of the cover. In such image forming apparatuses, the touch-panel device became the center of most user access. Therefore, when an antenna for short-range wireless communication was provided in the top surface section of the cover, user access was distributed among the location where the portable terminal was held and the touch-panel device, so there was a problem in that usability was decreased.

The present disclosure takes into consideration the situation described above, and provides an image forming apparatus that eliminates the aforementioned problems and is able to concentrate user access and maintain a high degree of usability.

The image forming apparatus of the present disclosure has the effect of making it possible to concentrate user access on an operation unit that includes a touch-panel device and maintain a high degree of usability even when performing short-range wireless communication using a portable terminal.

The present disclosure is not limited to the embodiments described above, and it is evident that the embodiments could be appropriately changed within the range of the technical scope of the disclosure. Moreover, the number, position, shape and the like of the components described above are not limited to the embodiment above, and when embodying the present disclosure it to use a suitable number, position, shape and the like. In the figures, the same reference numbers are used for component elements that are the same.

What is claimed is:

1. An image forming apparatus with a short-range wireless communication antenna, comprising:
    a main unit that comprises an image forming unit for performing image formation; and
    an operation unit that comprises a touch-panel device and that is attached to the front of the main unit; wherein
    the antenna is located on the inside of a housing of the operation unit in a space at the top of the inside of the housing where the touch-panel device is not located;
    the antenna comprises an antenna substrate and an antenna wire that is formed on one surface of the antenna substrate;
    the surface of the antenna substrate where the antenna wire is formed is arranged so as to face in the same direction as the display surface of the touch-panel device;
    the touch panel device is located such that the surface of the antenna substrate where the antenna wire is formed does not face the touch panel;
    and the antenna wire is located such that there are no metal objects located within 3 mm from the perimeter of the antenna wire.

2. The image forming apparatus according to claim 1, wherein the operation unit is attached so as to be able to rotate around an axis of rotation that is arranged in the horizontal direction of the main unit.

3. The image forming apparatus according to claim 1, wherein operation using the touch-panel device is disabled while short-range wireless communication by way of the antenna is established.

* * * * *